(12) United States Patent
Xiao et al.

(10) Patent No.: US 9,152,292 B2
(45) Date of Patent: Oct. 6, 2015

(54) IMAGE COLLAGE AUTHORING

(75) Inventors: Jun Xiao, Palo Alto, CA (US); C. Brian Atkins, Mountain View, CA (US); Xuemei Zhang, Mountain View, CA (US); Phil Cheatle, Bristol (GB); Yuli Gao, Palo Alto, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1668 days.

(21) Appl. No.: 12/366,616

(22) Filed: Feb. 5, 2009

(65) Prior Publication Data

US 2010/0199227 A1  Aug. 5, 2010

(51) Int. Cl.
*G06F 3/048* (2013.01)
*G06F 3/0481* (2013.01)
*G06T 11/60* (2006.01)
*G06F 9/44* (2006.01)
(Continued)

(52) U.S. Cl.
CPC .............. *G06F 3/0481* (2013.01); *G06T 11/60* (2013.01); *G06F 3/017* (2013.01); *G06F 3/0482* (2013.01); *G06F 3/0484* (2013.01); *G06F 3/04817* (2013.01); *G06F 3/04883* (2013.01); *G06F 3/1296* (2013.01); *G06F 9/4443* (2013.01); *G06F 17/30905* (2013.01); *H04N 2201/0082* (2013.01)

(58) Field of Classification Search
CPC . G06F 3/0484; G06F 3/04817; G06F 3/0481; G06F 3/0482; G06F 3/04883; G06F 3/017; G06F 9/4443; G06F 17/30905; G06F 3/1296

USPC ................................................. 715/863, 800
See application file for complete search history.

(56) References Cited

U.S. PATENT DOCUMENTS

| | | | |
|---|---|---|---|
| 5,136,686 | A | 8/1992 | Koza |
| 5,475,805 | A | 12/1995 | Murata |

(Continued)

FOREIGN PATENT DOCUMENTS

| | | |
|---|---|---|
| EP | 1186992 | 3/2002 |
| EP | 1503336 | 2/2005 |

(Continued)

OTHER PUBLICATIONS

Atkins, C.Brian, "Blocked Recursive Image Composition," ACM Multimedia, Oct. 2008, 4 pages.

(Continued)

*Primary Examiner* — Tuyetlien Tran
*Assistant Examiner* — Jaime Duckworth
(74) *Attorney, Agent, or Firm* — Mahamedi Paradice LLP

(57) ABSTRACT

A user interface that includes a catalog area, a collage mock-up area, and a mode select interface control operable to select an operational state of the user interface is displayed. Thumbnails of respective images are shown in the catalog area. A layout of a subset of the images is presented in the collage mock-up area. In response to the receipt of a user input gesture and a determination that the user interface is in a first operational state, a first action type is performed based on the type of the received user input gesture and the object type of the target object. In response to the receipt of the user input gesture and a determination that the user interface is in a second operational state, a second action type is performed based on the type of the received user input gesture and the object type of the target object.

19 Claims, 9 Drawing Sheets

(51) Int. Cl.

| | |
|---|---|
| G06F 3/0488 | (2013.01) |
| G06F 3/12 | (2006.01) |
| G06F 3/01 | (2006.01) |
| G06F 3/0482 | (2013.01) |
| G06F 17/30 | (2006.01) |
| G06F 3/0484 | (2013.01) |

(56) References Cited

U.S. PATENT DOCUMENTS

| | | | |
|---|---|---|---|
| 5,499,366 A | 3/1996 | Rosenberg et al. | |
| 5,552,982 A | 9/1996 | Jackson et al. | |
| 5,555,362 A | 9/1996 | Yamashita et al. | |
| 5,592,605 A * | 1/1997 | Asuma et al. | 715/775 |
| 5,659,770 A | 8/1997 | Yamada | |
| 5,706,457 A | 1/1998 | Dwyer | |
| 5,712,995 A | 1/1998 | Cohn | |
| 5,729,254 A | 3/1998 | Marks et al. | |
| 5,760,786 A | 6/1998 | Marks et al. | |
| 5,760,788 A * | 6/1998 | Chainini et al. | 345/474 |
| 5,796,401 A | 8/1998 | Winer | |
| 5,801,687 A * | 9/1998 | Peterson et al. | 715/201 |
| 5,889,523 A | 3/1999 | Wilcox et al. | |
| 5,898,434 A * | 4/1999 | Small et al. | 715/810 |
| 5,920,315 A | 7/1999 | Santos-Gomez | |
| 5,956,738 A | 9/1999 | Shirakawa | |
| 6,005,560 A | 12/1999 | Gill et al. | |
| 6,008,809 A | 12/1999 | Brooks | |
| 6,055,522 A | 4/2000 | Krishna et al. | |
| 6,057,842 A | 5/2000 | Knowlton et al. | |
| 6,081,262 A | 6/2000 | Gill et al. | |
| 6,097,389 A | 8/2000 | Morris et al. | |
| 6,111,586 A * | 8/2000 | Ikeda et al. | 15/79.1 |
| 6,121,970 A | 9/2000 | Guedalia | |
| 6,128,010 A * | 10/2000 | Baxter et al. | 715/846 |
| 6,256,108 B1 | 7/2001 | Dziesietnik et al. | |
| 6,301,586 B1 | 10/2001 | Yang et al. | |
| 6,380,954 B1 | 4/2002 | Gunther | |
| 6,415,306 B2 | 7/2002 | Seaman | |
| 6,448,956 B1 | 9/2002 | Berman et al. | |
| 6,563,602 B1 | 5/2003 | Uratani et al. | |
| 6,596,032 B2 | 7/2003 | Nojima et al. | |
| 6,636,648 B2 * | 10/2003 | Loui et al. | 382/284 |
| 6,636,650 B1 | 10/2003 | Long et al. | |
| 6,671,405 B1 * | 12/2003 | Savakis et al. | 382/203 |
| 6,701,306 B1 | 3/2004 | Kronmiller et al. | |
| 6,727,909 B1 | 4/2004 | Matsumura et al. | |
| 6,738,494 B1 * | 5/2004 | Savakis et al. | 382/100 |
| 6,748,097 B1 * | 6/2004 | Gindele et al. | 382/112 |
| 6,771,292 B2 | 8/2004 | Sharp | |
| 6,771,801 B1 | 8/2004 | Fisher et al. | |
| 6,977,665 B2 | 12/2005 | Yokouchi | |
| 7,013,432 B2 | 3/2006 | Taylor et al. | |
| 7,019,864 B2 | 3/2006 | Delhoune et al. | |
| 7,093,263 B1 | 8/2006 | Sexton et al. | |
| 7,096,445 B1 | 8/2006 | Pucci et al. | |
| 7,124,360 B1 | 10/2006 | Drenttel et al. | |
| 7,145,674 B2 | 12/2006 | Hayes | |
| 7,148,990 B2 | 12/2006 | Atkins | |
| 7,149,968 B1 | 12/2006 | Ackerschewski et al. | |
| 7,184,167 B1 | 2/2007 | Ito et al. | |
| 7,207,735 B2 | 4/2007 | Narusawa et al. | |
| 7,281,199 B1 | 10/2007 | Nicol et al. | |
| 7,290,006 B2 | 10/2007 | Xie et al. | |
| 7,340,676 B2 | 3/2008 | Geigel et al. | |
| 7,434,159 B1 | 10/2008 | Lin | |
| 7,640,516 B2 | 12/2009 | Atkins | |
| 7,644,356 B2 | 1/2010 | Atkins et al. | |
| 7,900,149 B2 | 3/2011 | Hatcher et al. | |
| 7,921,111 B1 * | 4/2011 | Beddow | 707/736 |
| 8,010,548 B1 * | 8/2011 | Beddow | 707/760 |
| 8,065,627 B2 | 11/2011 | Atkins | |
| 8,291,314 B2 | 10/2012 | Atkins | |
| 2001/0033296 A1 | 10/2001 | Fullerton et al. | |
| 2002/0051208 A1 | 5/2002 | Venable | |
| 2002/0059322 A1 | 5/2002 | Miyazaki et al. | |
| 2002/0064302 A1 * | 5/2002 | Massengill | 382/128 |
| 2002/0070982 A1 | 6/2002 | Hill et al. | |
| 2002/0122067 A1 * | 9/2002 | Geigel et al. | 345/788 |
| 2002/0124048 A1 * | 9/2002 | Zhou | 709/203 |
| 2002/0161777 A1 * | 10/2002 | Smialek | 707/102 |
| 2002/0196271 A1 * | 12/2002 | Windl et al. | 345/734 |
| 2003/0001879 A1 | 1/2003 | Lin et al. | |
| 2003/0007014 A1 | 1/2003 | Suppan | |
| 2003/0033288 A1 * | 2/2003 | Shanahan et al. | 707/3 |
| 2003/0046349 A1 * | 3/2003 | Burgin et al. | 709/206 |
| 2003/0046401 A1 * | 3/2003 | Abbott et al. | 709/228 |
| 2003/0059121 A1 * | 3/2003 | Savakis et al. | 382/239 |
| 2003/0072486 A1 * | 4/2003 | Loui et al. | 382/175 |
| 2003/0128877 A1 * | 7/2003 | Nicponski | 382/224 |
| 2003/0152289 A1 * | 8/2003 | Luo | 382/289 |
| 2003/0160824 A1 * | 8/2003 | Szumla | 345/769 |
| 2003/0162159 A1 * | 8/2003 | Sheehan | 434/362 |
| 2004/0122760 A1 | 6/2004 | Clearwater et al. | |
| 2004/0122805 A1 | 6/2004 | Sang et al. | |
| 2004/0122858 A1 | 6/2004 | Clearwater | |
| 2005/0071781 A1 | 3/2005 | Atkins | |
| 2005/0071783 A1 | 3/2005 | Atkins | |
| 2005/0138570 A1 | 6/2005 | Good et al. | |
| 2005/0168779 A1 * | 8/2005 | Tsue et al. | 358/1.18 |
| 2005/0168782 A1 | 8/2005 | Kobashi et al. | |
| 2005/0240865 A1 | 10/2005 | Atkins | |
| 2005/0243381 A1 * | 11/2005 | Hill et al. | 358/453 |
| 2005/0261881 A1 | 11/2005 | Jackson | |
| 2006/0026508 A1 | 2/2006 | Balinsky et al. | |
| 2006/0026515 A1 | 2/2006 | Balinsky | |
| 2006/0053370 A1 * | 3/2006 | Hitaka et al. | 715/517 |
| 2006/0103667 A1 | 5/2006 | Amit et al. | |
| 2006/0103891 A1 * | 5/2006 | Atkins | 358/450 |
| 2006/0109516 A1 * | 5/2006 | Catalan et al. | 358/302 |
| 2006/0136839 A1 | 6/2006 | Makela | |
| 2006/0150092 A1 * | 7/2006 | Atkins | 715/517 |
| 2006/0181548 A1 * | 8/2006 | Hafey et al. | 345/619 |
| 2006/0181736 A1 * | 8/2006 | Quek et al. | 358/1.18 |
| 2006/0195784 A1 | 8/2006 | Koivisto et al. | |
| 2006/0200758 A1 * | 9/2006 | Atkins | 715/517 |
| 2006/0224952 A1 | 10/2006 | Lin | |
| 2006/0233536 A1 * | 10/2006 | Shuhami | 386/120 |
| 2006/0259856 A1 | 11/2006 | Atkins | |
| 2006/0259857 A1 | 11/2006 | Atkins | |
| 2006/0279566 A1 * | 12/2006 | Atkins et al. | 345/418 |
| 2007/0008321 A1 * | 1/2007 | Gallagher et al. | 345/473 |
| 2007/0097421 A1 * | 5/2007 | Sorensen et al. | 358/1.15 |
| 2007/0208996 A1 | 9/2007 | Berkner et al. | |
| 2007/0234883 A1 * | 10/2007 | Koizumi | 84/615 |
| 2008/0065737 A1 * | 3/2008 | Burke et al. | 709/217 |
| 2008/0082912 A1 | 4/2008 | Atkins | |
| 2008/0094420 A1 * | 4/2008 | Geigel et al. | 345/660 |
| 2008/0134094 A1 | 6/2008 | Samadani et al. | |
| 2008/0215985 A1 * | 9/2008 | Batchelder et al. | 715/731 |
| 2008/0222560 A1 * | 9/2008 | Harrison | 715/800 |
| 2008/0270930 A1 * | 10/2008 | Slosar | 715/776 |
| 2008/0313533 A1 | 12/2008 | Hoyer et al. | |
| 2009/0002764 A1 | 1/2009 | Atkins et al. | |
| 2009/0089660 A1 | 4/2009 | Atkins et al. | |
| 2009/0147297 A1 * | 6/2009 | Stevenson | 358/1.15 |
| 2009/0307623 A1 * | 12/2009 | Agarawala et al. | 715/765 |
| 2010/0124378 A1 * | 5/2010 | Das et al. | 382/225 |
| 2010/0275152 A1 | 10/2010 | Atkins et al. | |
| 2010/0329575 A1 * | 12/2010 | Scalise et al. | 382/218 |

FOREIGN PATENT DOCUMENTS

| | | |
|---|---|---|
| GB | 2378340 | 5/2003 |
| JP | 01191270 | 8/1989 |
| JP | 09185728 | 7/1997 |
| JP | 10-293838 | 11/1998 |
| JP | 2002-142092 | 5/2002 |
| JP | 2002288669 | 10/2002 |
| JP | 2003101749 | 4/2003 |
| JP | 2003-274139 | 9/2003 |
| WO | WO-98/10356 | 3/1998 |

(56) References Cited

FOREIGN PATENT DOCUMENTS

| WO | WO-01/39019 | 5/2001 |
|---|---|---|
| WO | WO-02/37939 | 5/2002 |
| WO | WO-02/084582 | 10/2002 |

OTHER PUBLICATIONS

Chen, Jun-Cheng et al., "Tiling Slideshow," ACM Multimedia, Oct. 2006, 10 pages.

Diakopoulos, Nicholas and Essa, Irfan, "Mediating Photo Collage Authoring," UIST, Oct. 2005, 4 pages.

Fogarty, James et al., "Aesthetic Information Collages: Generating Decorative Displays that Contain Information," UIST, 2001, 10 pages.

Girgensohn, Andreas and Chiu, Patrick, "Stained Glass Photo Collages," UIST, Oct. 2004, 2 pages.

Graham, Adrian et al., "Time as Essence for Photo Browsing Through Personal Digital Libraries," JCDL, Jul. 2002, 10 pages.

Kerne, Andruid et al., "combinFormation: A Mixed-Initiative System for Representing Collections as Compositions of Image and Text Surrogates," JCDL, Jun. 2006, 10 pages.

Rother, Carsten et al., "AutoCollage," ACM Transacations on Graphics, vol. 25, Issue 3, Jul. 2006, 6 pages.

Xiao, Jun et al. "Mixed-Initiative Photo Collage Authoring," ACMMM, Oct. 2008, 11 pages.

C. Brian Atkins; "Adaptive Photo Collection Page Layout"; HP Labs; Palo Alto, CA 94304; 2004 Inti Conference, Oct. 24, 2004; <http://www.hpl.hp.com/researchlisl/layout>.

D.F. Wong, et al.; "A new algorithm for floorplan design"; Proc. Design Automation Conference; pp. 101-107, 1986.

Eldan Goldenberg, "Automatic layout of variable-content print data", MCs Dissertation, School of Cognitive & Computing Sciences, University of Sussex, Brighton, UK (2002).

International Searching Authority, International Search Report and Written Opinion, issued in PCT/US2010/054153, mailed Dec. 28, 2010.

Joe Geigel, et al.; "Automatic page layout using genetic algorithms for electronic albuming"; Proceedings of Electronic Imaging 2001 (Jan. 2001).

Joe Geigel, et al.; "Using Genetic Algorithms for Album Page Layouts"; Multimedia; IEEE, Volume: 10, Issue: 4, pp. 16-27, (Oct.-Dec. 2003).

* cited by examiner

IMAGE COLLAGE AUTHORING

CROSS-REFERENCE TO RELATED APPLICATIONS

This application also relates to the following co-pending applications, each of which is incorporated herein by reference:

U.S. patent application Ser. No. 10/675,724, filed Sep. 30, 2003;
U.S. patent application Ser. No. 10/675,823, filed Sep. 30, 2003;
U.S. patent application Ser. No. 11/127,326, filed May 12, 2005;
U.S. patent application Ser. No. 11/128,543, filed May 12, 2005;
U.S. patent application Ser. No. 10/831,436, filed Apr. 23, 2004;
U.S. patent application Ser. No. 11/126,637, filed Apr. 15, 2005;
U.S. patent application Ser. No. 11/151,167, filed Jun. 10, 2005;
U.S. patent application Ser. No. 11/069,512, filed Mar. 1, 2005;
U.S. patent application Ser. No. 10/987,288, filed Nov. 12, 2004;
U.S. patent application Ser. No. 11/364,933, filed Mar. 1, 2006;
U.S. patent application Ser. No. 11/607,181, filed on Dec. 1, 2006;
U.S. patent application Ser. No. 11/769,671, filed Jun. 27, 2007; and
U.S. patent application Ser. No. 11/865,112, filed Oct. 1, 2007.

BACKGROUND OF THE INVENTION

With the proliferation of digital cameras and memory cards, consumers are taking more images than ever. However, people rarely consume and repurpose their images beyond individual image prints. It is not that richer storytelling and sharing experiences lack perceived value—people enjoy receiving media creations such as image collages, calendars and books. Rather, the problem is that for most users, converting an image collection into an artifact that captures the story or memory is difficult, because the tools available are either too complicated to learn, or oversimplified to the point that they lack sufficient flexibility. Consider the example of creating a collage. Most users do not have access to truly flexible image manipulation and layout software, let alone the time and inclination to develop their own techniques. As a result, in typical solutions, flexibility is traded for the ease of use offered by rigid templates.

What are needed are improved systems and methods for authoring image collages.

BRIEF SUMMARY OF THE INVENTION

In one aspect, the invention features a method in accordance with which a user interface is displayed. The user interface includes a catalog area, a collage mock-up area, and a mode select interface control operable to select an operational state of the user interface. Thumbnails of respective images are shown in the catalog area. A layout of a subset of the images is presented in the collage mock-up area. An instance of a respective one of multiple types of user input gestures with respect to a target object displayed in the user interface is received. The target object is an instance of a respective one of multiple object types. In response to the receipt of the user input gesture instance and a determination that the user interface is in a first operational state, an instance of a first action type is performed based on the type of the received user input gesture and the object type of the target object. In response to the receipt of the user input gesture instance and a determination that the user interface is in a second operational state, an instance of a second action type is performed based on the type of the received user input gesture and the object type of the target object.

The invention also features apparatus operable to implement the inventive method described above and computer-readable media storing computer-readable instructions causing a computer to implement the inventive method described above.

Other features and advantages of the invention will become apparent from the following description, including the drawings and the claims.

DETAILED DESCRIPTION OF THE INVENTION

Figure 1:
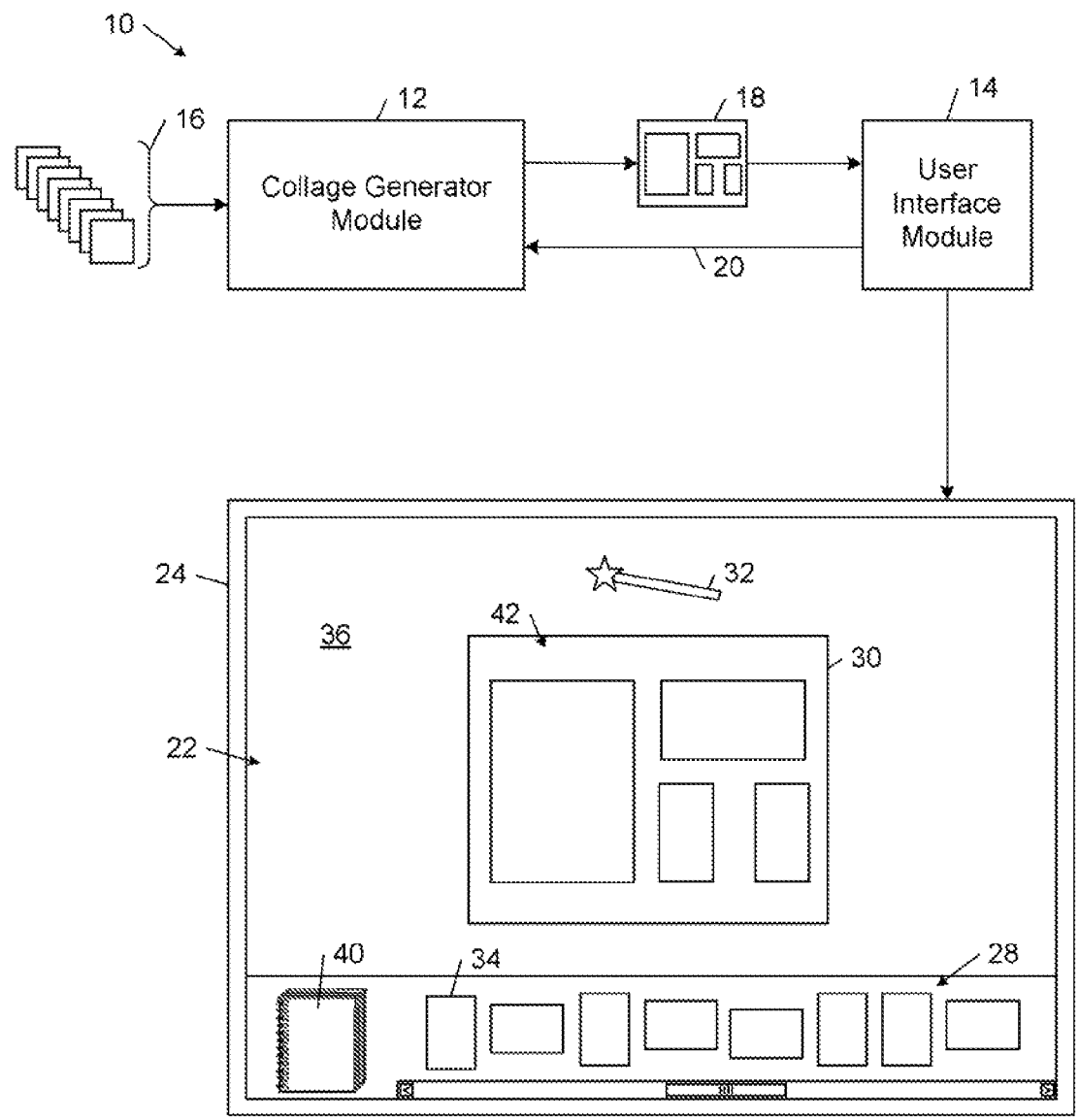
FIG. 1 is a block diagram of an embodiment of an image collage authoring system generating a user interface on a display.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

An "image collage" is a composition of images on a page.

An "image" broadly refers to any type of visually perceptible content that may be rendered on a physical or virtual page. Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image. In the illustrated embodiments, each of the images has a respective aspect ratio, which is the ratio of image height to image width. Each variable-area image may be assigned a respective positive scalar-valued nominal size. The term "nominal size" (also referred to as "relative area") refers to a designated or theoretical size that may or may not vary from the actual or rendered size, where the "size" of an image is the amount of area of a page that is occupied by the image. In some embodiments, the user is allowed to set the nominal size values that are assigned to the images. In other embodiments, the image collage authoring system automatically assigns the nominal size values to the graphic objects.

A "thumbnail" is a reduced-resolution version of an image.

As used herein, the term "page" refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

A "user input gesture" is any type of input that is received from a user and may be interpreted as a command. The input may correspond to any type of input that is generated by a pointing device that is capable of inputting commands into a computer. Exemplary pointing devices include hand-manipulated pointing devices, such as computer mice, joysticks, trackballs, touchpads, and keyboards, which commonly are used to input instructions into a computer by manipulating the pointing device. Such pointing devices allow a user to control movement of a cursor (i.e., a virtual pointer) across a computer screen, select or move an icon or other virtual object displayed on the computer screen, and open and close menu items corresponding to different input commands.

A "computer" is any machine device, or apparatus that processes data according to computer-readable instructions that are stored on a computer-readable medium either temporarily or permanently.

An "object" is any type of discrete element in a user interface that has state and behavior, and may be selected or otherwise usefully treated separately from other elements of the user interface. Exemplary objects include passive objects (e.g., buttons and hyperlinks) that trigger the performance of an action, and passive objects (e.g., image objects) on which actions are performed. When used to characterize an object, the term "target" is a label that refers to an object that is to be or has been selected or an object that is to be or has been affected by an action.

As used herein, the term "includes" means includes but not limited to, the term "including" means including but not limited to. The term "based on" means based at least in part on.

II. INTRODUCTION

The embodiments that are described herein provide an image collage authoring system that allows a user to retain control over the position and sizes of the images in a collage and to access image analysis based functionality that alleviates tedious and difficult tasks that commonly are associated with image selection, editing, and layout. These embodiments include a user interface that is designed to minimize the number and complexity of new concepts the users need to learn. The user interface provides a seamless integration between the images with which the user is engaged and the functionality used to control the images. The user interface has two modes of interaction: a basic mode that provides access to a basic set of intuitive features; and an enhanced mode that provides access to more complex functionality. The interaction model provides intelligent context-based interpretations of user inputs that enable the user to direct automatic selection, editing, and composition of images in accordance with the user's specific purpose, while avoiding overwhelming the user with decision-making and control settings when proactive suggestions can be made automatically.

III. OVERVIEW

FIG. 1 shows an embodiment of an image collage authoring system 10 that includes a collage generator module 12 and a user interface module 14 through which a user interacts with the image collage authoring system 10. In operation, the collage generator module 12 processes a set of images 16 to produce an image collage 18 in accordance with instructions 20 that are received from the user interface module 14. The user interface module 14 generates a user interface 22, which is displayed on a display 24. The modules of the image collage authoring system 10 are not limited to a specific hardware or software configuration, but rather they may be implemented in any computing or processing environment, including in digital electronic circuitry or in computer hardware, firmware, device driver, or software.

Figure 2:
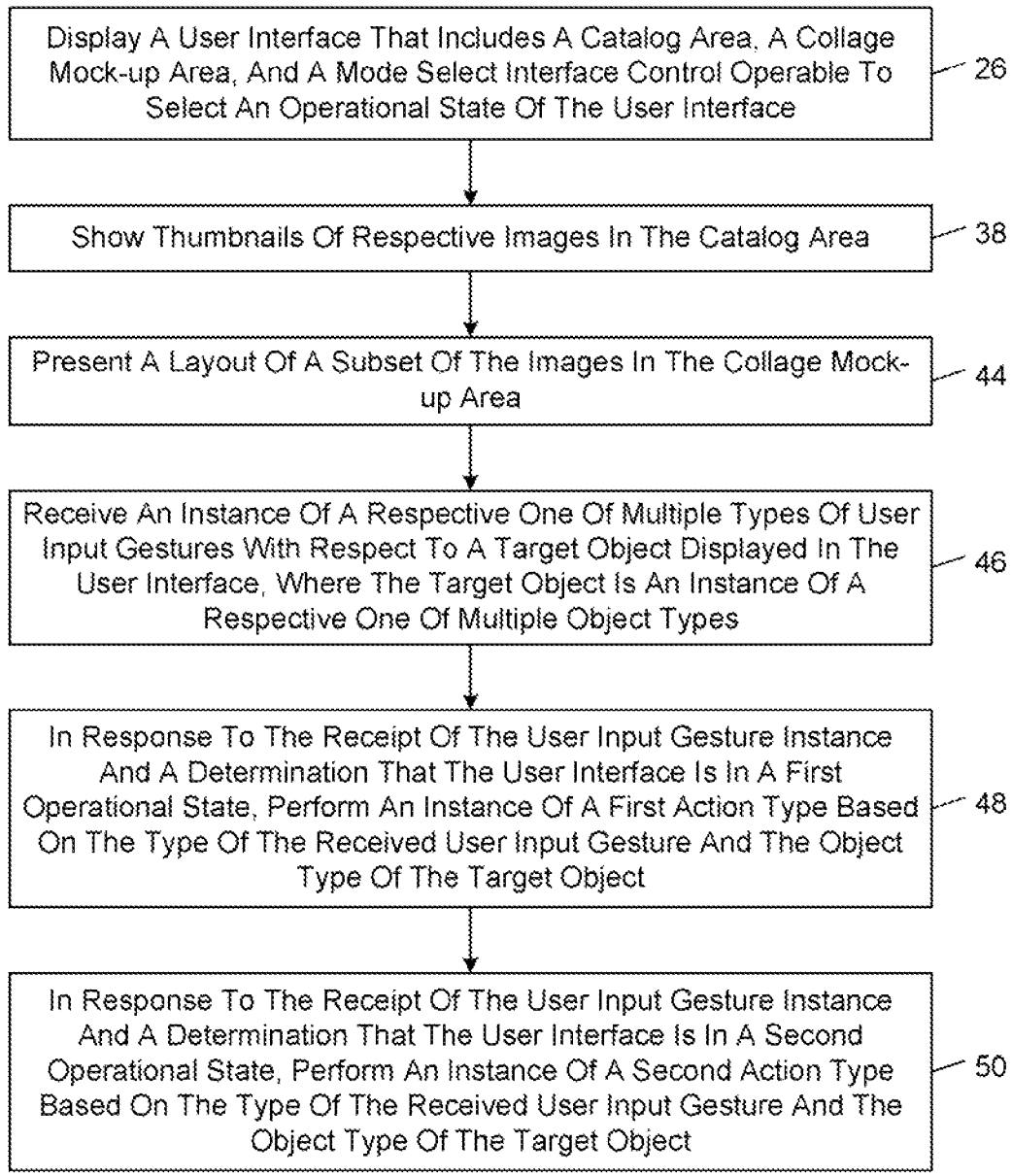
FIG. 2 is a flow diagram of an embodiment of a method of authoring an image collage.

FIG. 2 shows an embodiment of a method that is implemented by embodiments of the image collage authoring system 10.

In accordance with the method of FIG. 2, the image collage authoring system 10 displays the user interface 22 on the display 24 (FIG. 2, block 26). The user interface 22 includes a catalog area 28, a collage mock-up area 30, and a mode select interface control 32. The collage mock-up area 30 and the mode select interface control 32 typically are superimposed on a background 36. The mode select interface control 32 is operable to select an operational state of the user interface 22.

In the catalog area 28, the image collage authoring system 10 shows thumbnails 34 of respective ones of the images 16 (FIG. 2, block 38). In the illustrated embodiment, the thumbnails 34 are reduced-resolution versions of a collection of the image 16 that are grouped into an album that is represented by an album icon 40 in the catalog area 28. The images in the collection may be selected by a user or they may be selected automatically by the image collage authoring system 10. In some embodiments, the thumbnails 34 are generated by a thumbnail generation process that involves down sampling (e.g., average down sampling) of the images in the collection.

In some embodiments, the thumbnails 34 are generated in accordance with one or more of the methods described in U.S. application Ser. No. 11/607,181, which was filed on Dec. 1, 2006.

Figure 3:
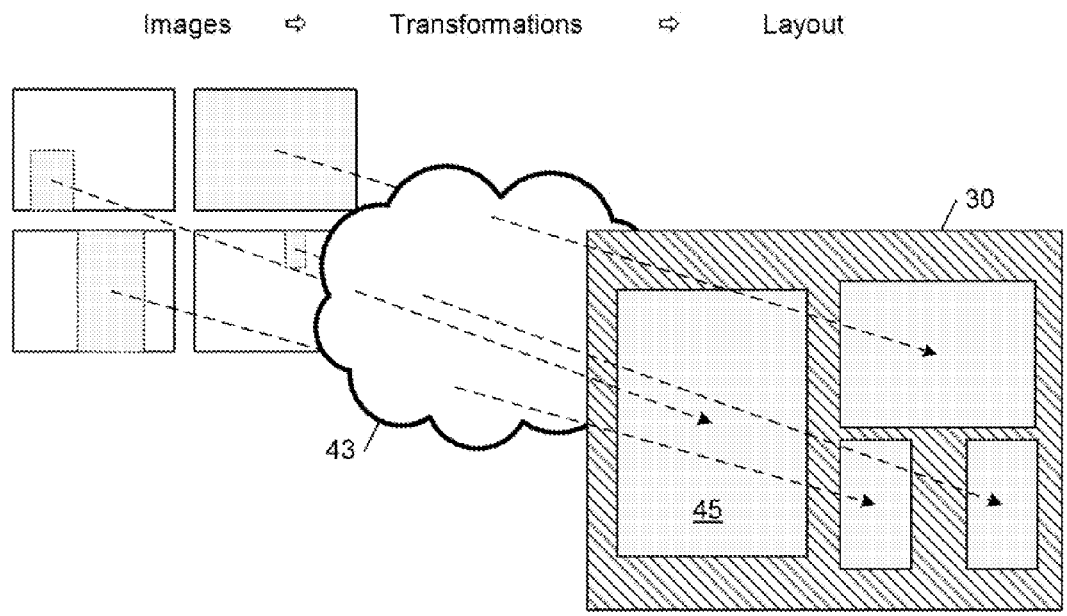
FIG. 3 is a diagrammatic illustrative view of images undergoing transformation and projection onto a layout of frames in a collage mock-up area.

The image collage authoring system 10 presents a layout 42 of a subset of the images in the collage mock-up area 30 (FIG. 2, block 44). The subset of the images may be selected manually by the user or automatically by the image collage authoring system 10, or a combination of both manual and automatic selection. As shown diagrammatically in FIG. 3, after the subset of images has been selected, the image collage authoring system 10 performs zero or more transformations 43 (e.g., scaling, cropping, and filtering operations) on the images to produce a set of transformed images. The image collage authoring system 10 projects the transformed images onto a set of frames 45 that are superimposed on the collage mock-up area 30. The layout 42 is defined by a specification of size dimensions and positions of the frames 45 on a page that is represented by the collage mock-up area 30.

The image collage authoring system 10 receives an instance of a respective one of multiple types of user input gestures with respect to a target object that is displayed in the user interface 22 (FIG. 2, block 46). Exemplary types of user input includes point-and-click, drag-and-drop, and scroll gestures, which may be input via any type of input device (e.g., a computer mouse, a joystick, a trackball, a touch pad, and a touch screen). The target object is an instance of a respective one of multiple object types, including persistent interface objects (e.g., the mock-up area 30 and the model select interface control 32) and variable interface objects (e.g., the thumbnails 34, the album icon 40, and any of the images in the layout 42).

The image collage authoring system 10 performs a context-dependent action that depends on the type of user input gesture, the type of object towards which the user input gesture is directed, and the operational mode of the user interface 22. For example, in response to the receipt of the user input gesture instance and a determination that the user interface 22 is in a first operational state, the image collage authoring system 10 performs an instance of a first action type based on the type of the received user input gesture and the object type of the target object (FIG. 2, block 48). In response to the receipt of the user input gesture instance and a determination that the user interface 22 is in a second operational state, image collage authoring system 10 performs an instance of a second action type based on the type of the received user input gesture and the object type of the target object (FIG. 2, block 50).

In the illustrated embodiments, the mode select interface control 32 allows the user to select between a basic operational mode that provides access to a set of basic image collage authoring functions, and an enhanced operational mode that provides access to more complex enhanced functions. The basic functions tend to be more intuitive manual type of functions, whereas the enhanced functions tend to be more directed or automated functions. The separation of the basic and enhanced interface functions into two discreet operational modes allows the user to easily compartmentalize the two sets of functions in his or her mind and thereby readily and intuitively comprehend and remember a larger set of interface tools than would be possible if the functions were not separated in this way.

The user interface 22 also provides the user with visible feedback that reminds the user of the current operational mode. For example, in some embodiments, the pointer used by the user to interact with the user interface 22 is different for each of the operational modes. In the illustrated embodiments, the user's pointer corresponds to a standard pointer (e.g., an arrow pointer) in the basic operational mode, and corresponds to a different pointer (e.g., the magic wand pointer shown in FIG. 1) in the enhanced operational mode. In these embodiments, the user switches to the enhanced operational mode by clicking on the mode select interface control 32. In response, the user's icon changes to the magic wand pointer and the mode select interface control 32 changes to an indented (or pushed-in) version of the magic wand pointer that demarcates a storage location for the magic wand. From the user's perspective, it appears as if the user has picked up the magic wand from its storage location. The user returns to the basic operational mode by clicking on the mode select interface control 32 with the magic wand pointer. This changes the mode select interface control 32 back to its previous appearance and changes the user's pointer back to the standard pointer. From the user's perspective, it appears as if the user has returned the magic wand to its storage location.

IV. EXEMPLARY EMBODIMENT OF THE DYNAMIC IMAGE COLLAGE GENERATOR

A. Introduction

Figure 4:
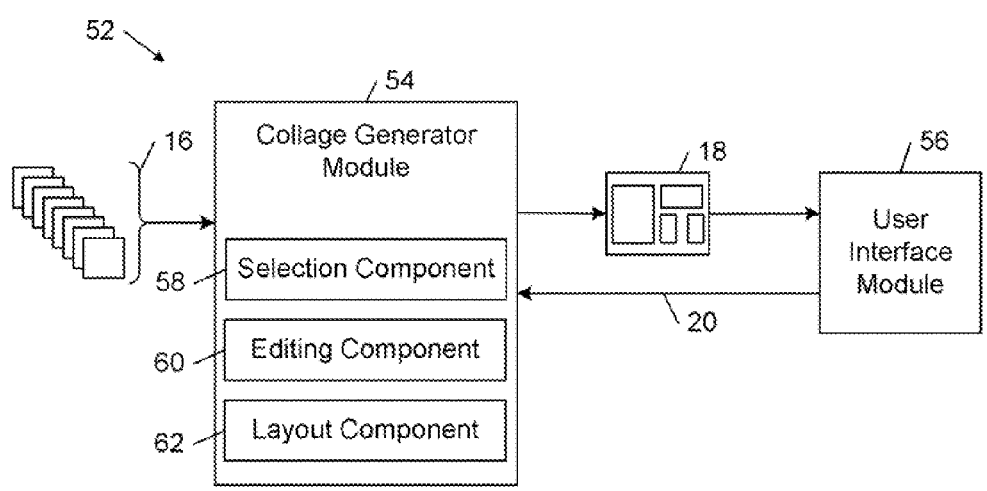
FIG. 4 is a block diagram of an embodiment of the image collage authoring system of FIG. 1.

FIG. 4 shows an embodiment 52 of the image collage authoring system 10 that includes an embodiment 54 of the collage generator module 12 and an embodiment 56 of the user interface module 14.

The collage generator module 54 includes a selection component 58, an editing component 60, and a layout component 62. The selection component 58 makes proactive suggestions about which images are to be added to the collage as well as help the users to find similar or related images. The editing component 60 applies conservative yet effective auto-crop to the images and enhances their tone and color automatically. The layout component 62 provides alternative layout suggestions as well as accommodates changes the user makes to the individual images and the layout, all while satisfying various constraints.

The user interface module 56 provides seamless access to the functionalities of all the components 58-62 in a natural and intuitive way so that users do not have to memorize what the automation tools do or how they work. In addition, the user interface creates a fluid transition experience between fully manual functions and fully automatic functions.

1. User Interface Module

In the illustrated embodiment, the user interface module 56 defines a minimal set of computer mouse operations, including left button single click, drag, drop, and mouse wheel scrolling. The effect of computer mouse operations depends on the context in which it is made (e.g., the object upon which it is made and which mode, basic or enhanced, the user interface 22 is in).

In some embodiments, a list of albums is shown in the catalog area 28 when the application starts. The user can click on an individual album to load the set of images that are associated with the selected album. The album is represented by the album icon 40 and the associated images 34 are presented as an image strip, as shown in FIG. 1. The user can switch between the album list view and the image strip view by clicking on the album icon 40. The enhanced and basic modes are toggled by clicking the magic wand icon 32. The visual feedback to the user is that the wand is picked up or dropped back. The magic wand typically is available only after an album finishes loading. In some embodiments, when the mouse pointer hovers over an object, tooltips that describe the actions that are available on targeted object are shown in the user interface 22.

In general, the user interface 22 may provide access to a wide variety of different functions in the basic and enhanced modes of operations.

In some embodiments, the collage mock-up area 30 includes a user-selectable mock-up area background object over respective portions of which the images of the collage layout are presented. The mock-up area background object is operable to change the layout of the images presented in the collage mock-up area. In particular, in response to a determination that the user has input made a point-and-click gesture with respect to the mock-up area background object, the collage generator module 12 changes the layout from a current layout to a new layout of the images in the subset. When the user interface 22 in the basic operational mode, the layout is changed by maintaining relative sizes and positions of the images in the layout while changing the layout between (i) a straight layout in which respective edges of adjacent ones of the images in the subset are parallel across respective dimensions of the layout and (ii) a tilted layout in which respective edges of adjacent ones of the images in the subset are non-parallel across respective dimensions of the layout. When the user interface in the enhanced operational mode, the layout is changed by changing ones of the images in the collage in terms of at least one of relative size and relative position.

In some embodiments, in response to a determination that the user interface is in the basic operational mode and the received user input gesture instance is a point-and-click gesture with respect to a target one of the images presented in the collage mock-up area 30, the collage generator module 12 selects the target image. In response to a determination that the user interface is in the enhanced operational mode and the received user input gesture instance is a point-and-click gesture with respect to a target one of the images presented in the collage mock-up area 30, the collage generator module 12 creates a modified instance of the target image and replacing the target image with the modified instance in the layout. In some embodiments, the collage generator module 12 creates the modified instance of the target image by performing at least one of: (i) automatically cropping the target image, and (ii) automatically enhancing the target image.

As explained above, in some embodiments of the user interface 22, the catalog area 28 includes an album area and an image area, where the album area includes the album icon 40, which is associated with a collection of images corresponding to the thumbnails 34 that are shown in the image area. In response to a determination that the user interface is in the enhanced operational mode and the received user input gesture instance is a point-and-click gesture with respect to the album icon, the collage generator module 12 automatically selects an image from the collection, adds the selected image to the images in the subset to produce a new subset of images, and determines a new layout of the images in the new subset of images. The user interface 22 presents the new layout in the collage mock-up area. In response to a determination that the user interface is in the enhanced operational state and the received user input gesture instance is a point-and-click gesture with respect to a target one of the images represented by the thumbnails shown in the image area, the collage generator module 12 automatically rearranges the thumbnails shown in the image area according to similarity between the target image and other ones of the images in the collection.

In some embodiments, the user interface 22 presents a respective view of each of the images in the collage through a respective frame that defines a boundary around the view of the image. In response to a determination that the user interface is in the basic operational mode and the received user input gesture instance is a drag-and-drop gesture defining a movement from first position over a target one of the images within a target one of the frames to a second position within the target frame, the collage generator module 12 repositions the target image within the target frame to define a different respective view of the target image through the frame. In response to a determination that the user interface is in the basic operational mode and the received user input gesture instance is a drag-and-drop gesture defining a movement from a first position over a first one of the images within a first one of the frames to a second position over a second one of the images within a second one of the frames, the collage generator module 12 swaps positions of the first and second images in the layout and the user interface 22 presents a view of the first image through the second frame and presenting a view of the second image through the first frame. In response to a determination that the user interface is in the basic operational mode and the received user input gesture instance is a scroll gesture with respect to a target one of the images in the layout, the collage generator module 12 re-sizes a region of the target image that is presented through the respective frame.

In some embodiments, in response to a determination that the user interface is in the enhanced operational mode and the received user input gesture instance is a drag-and-drop gesture defining a movement from a first position over a first one of the images in the layout to a second position over a second one of the images in the layout, the collage generator module 12 swaps relative positions of the first and second images in the layout. In this process, the collage generator module 12 determines a new layout of the images that exchanges the relative positions of the first and second images and maintains relative positions of all other ones of the images in the subset. The user interface 22 presents the new layout in the collage mock-up area.

In some embodiments, in response to a determination that the user interface is in the enhanced operational mode and the received user input gesture instance is a drag-and-drop gesture defining a movement from a first position over a selected one of the thumbnails to a second position over a target one of the images in the layout, the collage generator module 12 replaces the target image in the layout with the image corresponding to the selected thumbnail. In this process, the collage generator module 12 replaces the target image with the image corresponding to the selected thumbnail in the subset produce a new subset of images and determines a new layout of the images in the new subset of images. The user interface 22 presents the new layout in the collage mock-up area. In some embodiments, the collage generator module 12 determines the new layout with the image corresponding to the selected thumbnail positioned in an equivalent relative position in the layout as the target image.

In some embodiments, in response to a determination that the user interface is in the enhanced operational state and the received user input gesture instance is a scroll gesture with respect to a target one of the images in the layout, the collage generator module 12 re-sizes the target image to a new size and determines a new layout of the images that accommodates the new size of the target image and maintains relative positions of the images in the layout. The user interface 22 presents the new layout in the collage mock-up area.

Table 1 provides a summary of the basic functions that are available in an exemplary embodiment of the user interface 22.

TABLE 1

Basic Mode Functions

| BUTTON | OBJECT | ACTION |
|---|---|---|
| Left-Click | Collage Mock-Up Area Background | Toggle: Straight/Tilted Layout |
| | Album Icon | Toggle: Album Index/Image Strip |
| Drag/Drop | Image From Image Strip Image To Collage Mock-Up Area | Add Image To Collage |
| | Image From Collage Mock-Up Area To Area Outside Collage Mock-Up Area | Remove Image From Collage |
| | Image Within Its Frame | Reposition Image Relative To Its Frame |
| | Move Image From One Frame To Another Frame In The Collage Mock-Up Area | Swap Positions Of Images To Each Other's Frames |
| Scroll | Image In Collage Mock-Up Area | Zoom-In Or Zoom-Out |
| Scroll + Drag | Image Within Its Frame | Zoom-In Or Zoom-Out/Crop Parts That Don't Fit In Frame |

In the basic operational mode, a user can drag an image from the image strip to the collage mock-up area 30 to add an image to the collage. A new collage layout is generated immediately. To remove an image from the collage mock-up area 30, the user simply drags and drops the image outside of collage mock-up area 30. Clicking on the background of the collage mock-up area 30 (i.e., the regions of the collage mock-up area unobscured by the image frames 45) toggles between a straight layout (shown in FIG. 1) and tilted version of the same layout in which respective edges of adjacent ones of the images in the subset are non-parallel across respective dimensions of the layout. Scrolling the computer mouse wheel over an image in the layout 42 zooms it in or out, and dragging an image within its frame 45 repositions the image relative to its frame. By combining dragging and mouse wheel scrolling operations, the user can manually crop a selected image on the collage mock-up area 30. Two images on the same layout can be switched by dragging an image on the collage mock-up area 30 to another collage mock-up area 30 image location.

Table 2 provides a summary of the enhanced functions that are available in the exemplary embodiment of the user interface 22.

TABLE 2

Enhanced Mode Functions

| BUTTON | OBJECT | ACTION |
|---|---|---|
| Left-Click | Collage Mock-Up Area Background | Cycle through alternative layouts |
| | Album Icon | Add Auto-Selected Image To Collage Mock-Up Area; Can Be Done Repeatedly |
| | Image In Collage Mock-Up Area | Toggle: Auto-Crop/Auot-Enhance |
| | Image In Image Strip | Sort Images In Image Strip By Similarity To Target Image |
| Drag/Drop | Image From Image Strip Image To Collage Mock-Up Area | Add Image To Collage |
| | Image From Image Strip To Position Of Image Currently In Collage Mock-Up Area | Replace Image Currently In Layout With Image From Image Strip |
| | Move Image From One Frame To Another Frame In The Collage Mock-Up Area | Swap Relative Positions Of Images; Auto-Adjust Layout To Accommodate New Positions |
| Scroll | Image In Collage Mock-Up Area | Increase/Decrease Image Frame |

Figure 10:
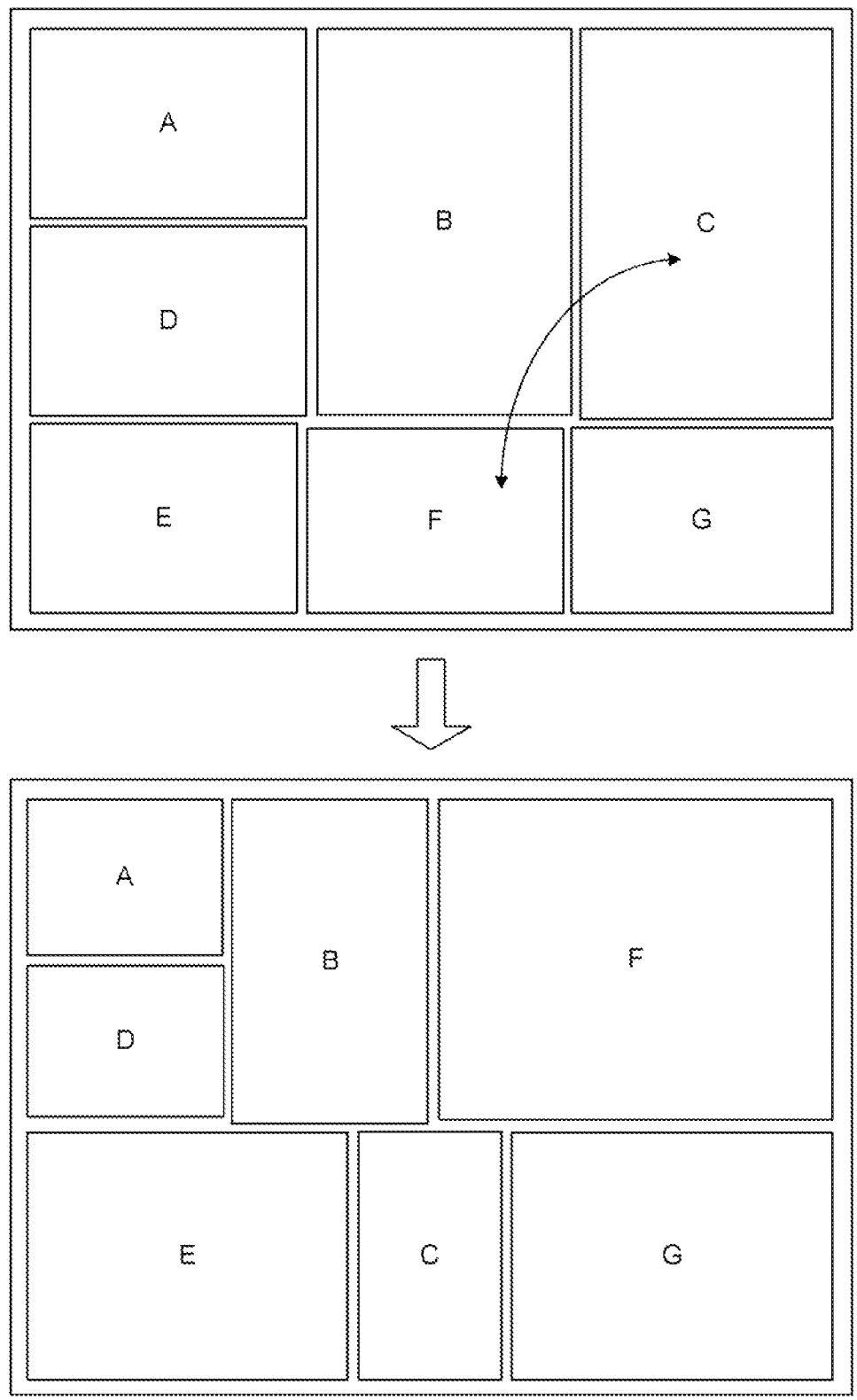
FIG. 10 is a diagrammatic view of a first image collage and a second image collage that is generated by swapping two images in the first image collage in accordance with an embodiment of an image collage generation process.

In the enhanced operational mode, when a user drags and drops existing images into the collage mock-up area 30, the image collage authoring system 52 preserves image aspect ratios and adjusts the layout 42 to accommodate the switch (see FIG. 10). The user also can replace a target image in the collage mock-up area 30 by dragging another image from the image strip and dropping it on top of the target image. Clicking on an image in the collage mock-up area 30 with the magic wand toggles auto-crop and auto-enhance on and off for that image. Scrolling the computer mouse wheel over an image in the collage mock-up area 30 grows or shrinks the size of this image within the layout. To add an auto-selected image to the collage mock-up area 30, the user can simply click the album icon 40 using the magic wand. Repeated clicks can be used to quickly auto-populate the collage. Clicking the magic wand on a target image on the image strip sorts all images by similarity to the targeted image (see FIG. 5). Clicking the magic wand on the collage mock-up area 30 background cycles through alternate layouts. In some embodiments, the following alternative layouts can be generated: one layout uses default target areas, which starts out as equal for all images but can be changed by user-initiated grow/shrink actions; another layout is generated using larger target areas for images with higher image sharpness scores; and, if there are images on the collage with faces, a third layout is generated in which images that have a greater number of detected faces are given larger target areas in the layout 42.

2. Collage Generator Module

The collage generator module 54 includes a selection component 58, an editing component 60, and a layout component 62.

a. Selection Component

Among the most tedious and time-consuming tasks in making a collage are sorting the image collection appropriately, and selecting images that best represent the collection. The selection component 58 uses analysis-based mechanisms for finding similar images and for recommending images that best represent the collection.

i. Fast Image Similarity

In the illustrated embodiments, an image collection is represented in the image strip area of the catalog area 28. The images are presented a single row of images along the bottom of the user interface 22. The image strip can be navigated by scrolling horizontally. In many contexts, it is advantageous to order images according to time stamp; however, in others, such an ordering is either impossible or inadequate. Firstly, metadata—including time stamps—may be absent or inconsistent. For example, it may not have been recorded; it may have been stripped or modified in previous editing; or time stamps from different clocks can disagree. Secondly, users often consider criteria other than time. For example, when assembling a collage from a museum tour, the time dimension may not be as important as the distribution of exhibits visited. In general, sorting images by content similarity can help users quickly find shots of subjects or scenes, regardless of available metadata. In the illustrated embodiments, the default order of the image strip is according to filename, which usually correlates with time.

Figure 5:
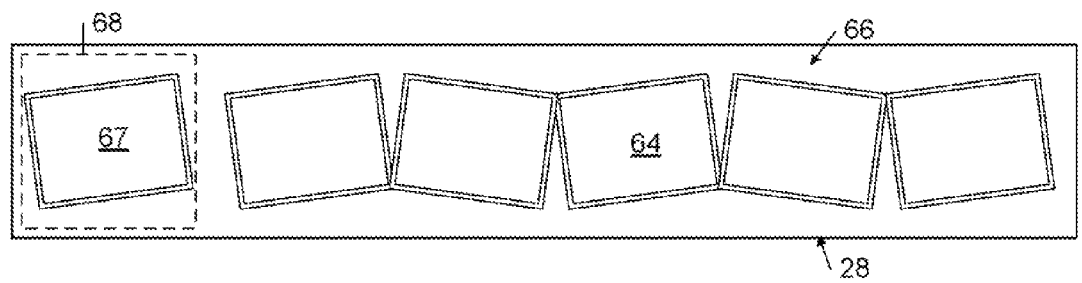
FIG. 5 is a diagrammatic view of an embodiment of a catalog area of the user interface shown in FIG. 1.

As shown in FIG. 5, in the enhanced operational mode, the user can click a target thumbnail 64 in the image strip 66 in order to have the system sort the images in the image strip according to similarity with a target image that is represented by a target thumbnail 64. In FIG. 5, a duplicate 67 of the target thumbnail 64 is presented at the fall left end of the image strip 66 and highlighted by a highlight box 68; the remaining images are displayed in the image strip 66 in order of their respective similarities to the target image.

In general, any type of image similarity based sorting process may be used to sort the images in the image strip. These sorting processes typically are based on one or more of the following types of content similarity metrics, which can be roughly classified according to feature granularity as follows: (a) global features such as color histogram; (b) region-based features extracted from segmented images; and (c) key-point features extracted from interest-point detectors such as SIFT (see, e.g., Lowe, D. G., Distinctive image features from scale-invariant keypoints. IJCV, 2004). Generally, finer granularity leads to more accurate results, but at the cost of greater computation.

In some embodiments, a region-based image similarity sorting process is used. In this process, segmentations of the images are generated using a fast algorithm that is described below in sub-section IV.A.2.b. As a result, each image is represented by an image-dependent set of color clusters. Content similarity is then measured using the Earth Mover Distance (EMD) (see, e.g., Rubner, Y., Tomasi, C. and Guibas, L. J. A Metric for Distributions with Applications to Image Databases. ICCV, 1998), which solves for the minimal transportation cost that must be paid to transform one color distribution to the other.

ii. Automatic Image Suggestion

The selection component 58 is designed to alleviate two specific image selection scenarios: auto-population, and incremental population. In the auto-population scenario, the goal is to automatically generate a complete collage, as a starting point. In the incremental population scenario, the goal is to select a new image, from a cluster that is not already represented on the collage if possible. In some embodiments, both scenarios follow the same process. First, the image collection is partitioned into clusters of duplicates. This may be followed by a second partitioning, if necessary, to arrive at a set of "suggestion clusters". Finally, a suggested image is selected from each suggestion cluster.

In the auto-populate scenario, we first determine the number of images to appear in the collage. A maximum number of images T>0 is set beforehand based on the size of the collage, to avoid a crowded result. If the number of duplicate cluster is less than or equal to T, then the suggestion clusters are the duplicate clusters. Otherwise, the suggestion clusters are determined by splitting the sequence at the greatest T−1 similarity gaps.

In the incremental suggestion scenario, the set of duplicates is the set of suggestion clusters. When the user issues a command to add a new suggested image, each suggestion cluster represented by an image on the collage is removed from consideration, and a rotating counter is used to identify the next suggestion cluster.

When the suggestion clusters have been determined, each image is assigned a composite score that is a weighted combination of two metrics described below: typicality within its suggestion cluster, and image sharpness. For each suggestion cluster, the image with the highest composite score is deemed the "best representative."

Duplicate Detection

In some embodiments, duplicate detection is based on similarity alone.

In the illustrated embodiments, time information is used if it is available so as to leverage the fact that duplicate shots are often taken close in time. In these embodiments, two different binary classifiers were trained based on manually labeled pairs of consumer images. Each classifier is capable of deciding whether two arbitrary images are duplicates: one using both similarity and time, and the other using only similarity. Content similarity is measured using the fast algorithm from section IV.A.2.a.i. In some embodiments, a Support Vector Machine (SVM) (see, e.g., Chang, C. C. and Lin, C. J. LIBSVM: a library for support vector machines, 2001. Software available at http://www.csie.ntu.edu.tw/~cjlin/libsvm) is used to train the duplicate detectors with a linear kernel. Ten-fold cross validation was used to evaluate the accuracy of the resulting detectors.

In other embodiments, key-point based algorithms are used for near duplicate detection (see, e.g., Ke, Y., Sukthankar, R. and Huston, L. An efficient parts-based near-duplicate and sub-image retrieval system. ACM Multimedia, 2004, and Zhang D. Q. and Chang S. F. Detecting image near-duplicate by stochastic attributed relational graph matching with learning. ACM Multimedia, 2004).

Typicality Metric

The most typical image shares the most information with all other images in the cluster. This is equivalent to finding the sample that maximizes its average similarity to the rest of images in the same cluster. In effect, this metric is used to filter outliers and minimize the propagation of clustering errors to the image suggestion algorithm.

Sharpness Metric:

Image quality is a general concept that has many dimensions. For example, a good image should have good exposure, contrast, and color; in addition to good composition, focus on the subject, and pleasing facial expressions.

Figure 6A:
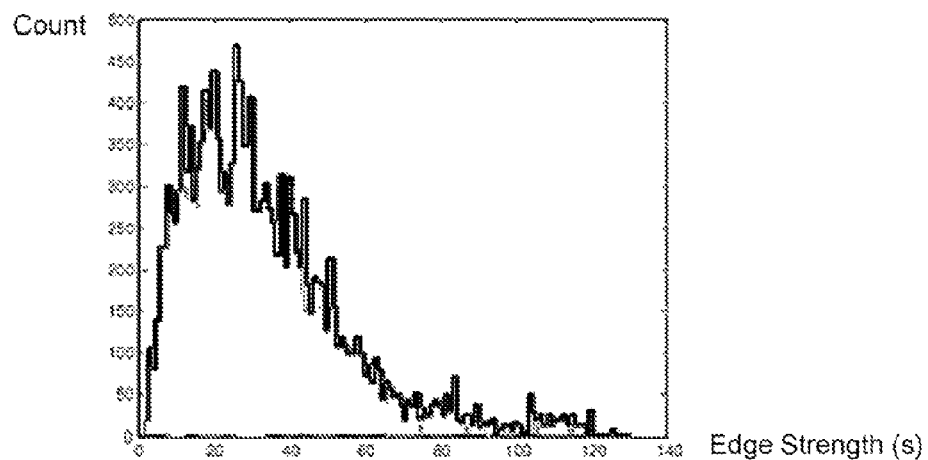
FIGS. 6A and 6B are exemplary edge strength histograms.
Figure 6B:
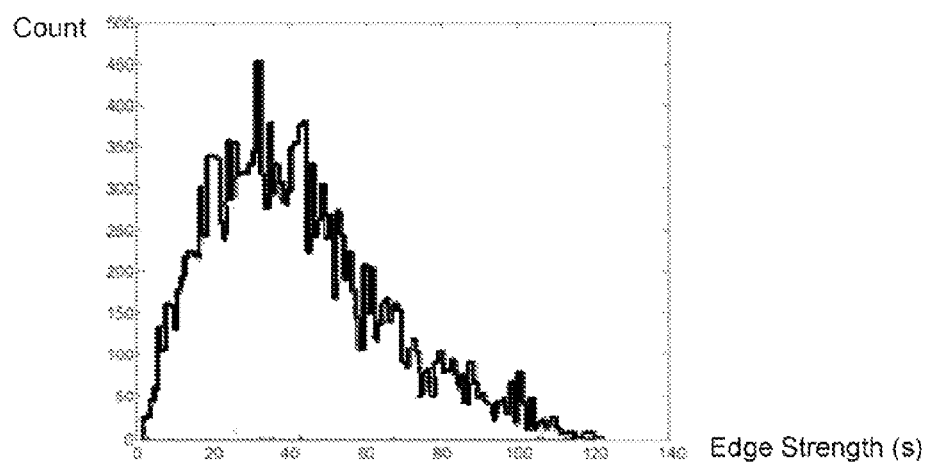

Blur in images often results from motion or lack of focus. Regardless of the cause, blur weakens the major edges in images. For example, in FIGS. 6A and 6B, the edge strength histograms are shown for two very similar images, one blurry (FIG. 6B) and the other non-blurry (FIG. 6A). The edge strength histogram of the blurry image is flatter in shape, and smaller in range than the non-blurry one due to the smoothing effect from out of focus. This observation is captured by the following sharpness score (Q):

$$Q = \frac{\text{strength}(s)}{\text{entropy}(h)}$$

where strength(s) is the average edge strength of the top 10% strongest edges and entropy(h) is the entropy of the normalized edge strength histogram. Non-blur images have stronger edges and more peaky edge strength distribution, therefore large strength(s) and smaller entropy(h), resulting a larger Q value.

b. Editing Component

Consumer photographers frequently pay little attention to scene composition. Oftentimes, the subject is too small, with excess empty space; or distractions at the edges attract the eye away from the main subject area. Appropriate cropping can significantly enhance the visual impact of many images. A by-product of cropping is often a change in aspect ratio which better suits the image content, and typically produces more interesting collage layouts as a result of the variety of aspect ratios.

i. Auto-Crop Function

In some embodiments, automatic image cropping involves two steps: a) image saliency analysis to identify the subject; and b) positioning of crop boundaries to include the subject area in an aesthetically pleasing way.

In general, any of a wide variety of processes for automatically identifying salient regions of interest (ROIs) in images may be used. Some embodiments use a multi-resolution center-surround difference technique (see, e.g., Itti, L., Koch, N., and Niebur, E. A model of saliency-based visual attention for rapid scene analysis. *IEEE Trans. on PAMI*, 20(11): 1254-1259). Other embodiments adopt a segmentation based approach as an alternative to saliency; segmentation produces crisp region boundaries which facilitate the optimization of crop boundary position.

Figure 7A:
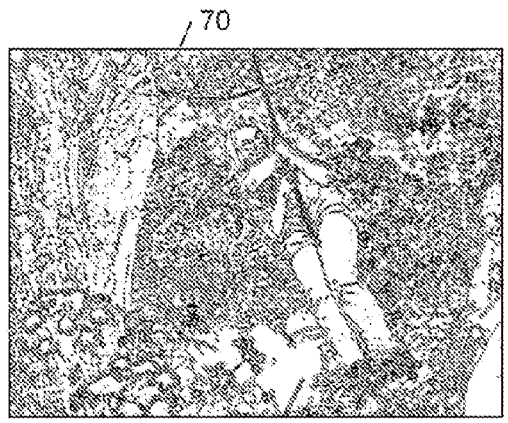
FIG. 7A is a stylized view of an exemplary image.
Figure 7B:
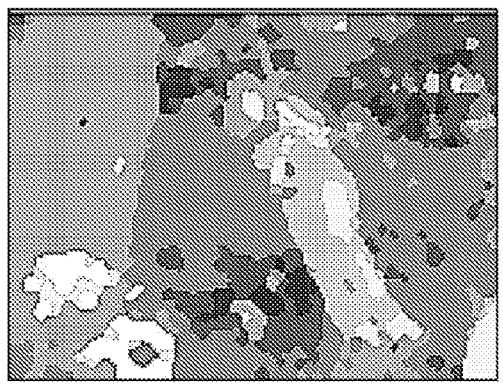
FIG. 7B is a view of an embodiment of a segmentation map generated from the image shown in FIG. 7A in accordance with an embodiment of an image cropping process.

Referring to FIGS. 7A-7D, in one embodiment, a color clustering segmentation process is used to reduce the exemplary image 70 to around twenty representative color clusters, as shown in FIG. 7B. Color clusters are assigned a background probability, such that large clusters and clusters close to large clusters (in the CIELab color space) have a high background probability. Each region, (connected component of pixels in the same color cluster), is then classified as "subject", "background" or "distraction". A probability for each of these classes is derived heuristically by modifying the region's color cluster background probability, on the basis of region size and position. Large regions close to the edge are more likely to be background; unusual color, medium sized regions which are relatively central are more likely to be subject; unusual color regions at the edge of the frame are likely to be distractions. Regions are assigned to the class with the highest probability. This produces a saliency map 72 of the type shown in FIG. 7C, where the different shades denote the subject, the background, and the distraction. A few small regions may be unclassified and strong region boundaries also may be indicated by darker shades of gray.

The saliency map 72 is augmented with face detection to identify the heads and shoulders of people in the image. The bounding box of all detected people is called the "people box". In general, any type of face detection process may be used. An exemplary face detection process is described in Viola, P. and Jones, M. Robust Real-Time Face Detection. IJCV, 2004.

Figure 7C:
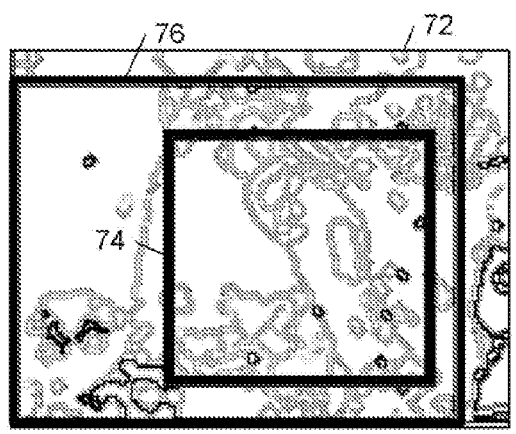
FIG. 7C is a view of an embodiment of a saliency map and two overlying crop boundaries generated from the image shown in FIG. 7A in accordance with an embodiment of an image cropping process.
Figure 7D:
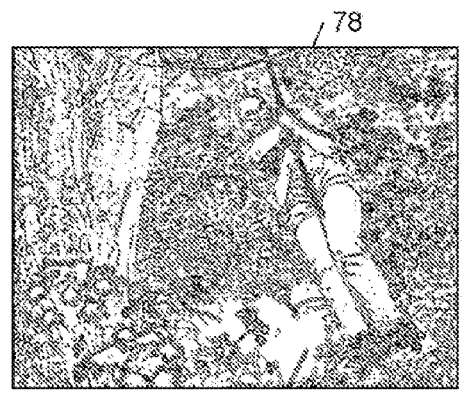
FIG. 7D is a view of a cropped version of the stylized image shown in FIG. 7A based on the crop boundaries shown in FIG. 7C in accordance with an embodiment of an image cropping process.

Crop boundary locations are selected by first finding a "minimum crop rectangle" 74 in the saliency map 72. Then the possible rectangle locations which include the minimum crop rectangle are searched using an optimization criterion to select an output crop rectangle 76, as shown in FIG. 7C. The regions of the original image 70 outside the output crop rectangle 76 are cropped to produce the cropped image 78 shown in FIG. 7D The minimum crop rectangle is created by first forming "subject boxes"—rectangular areas which contain adjacent subject regions. Overlapping subject boxes are merged. Each subject box is scored using the sum of the areas of its subject regions which do not touch the image boundary. The bounding box of these regions is called the "core" of the subject box. The minimum crop rectangle is initially set to the core of the subject box with the highest score. This is expanded to include the people box and the central 15% of the image area. To prevent erroneous cropping of unusual images, the central 25% of the image area is added if the minimum crop rectangle is less than 20% of the image area, or if the area of subject regions in the minimum crop rectangle are less than 10% of the image area.

The optimization search finds the crop that minimizes a combination of penalties for: large crop area; Inclusion of distractions; proximity to minimum crop rectangle; proximity to strong region edges parallel to a crop edge; and crossing strong region edges. The penalty function finds crop borders which leave space around the subject, while still producing a reasonably tight crop, rather than simply cropping the ROI (see, e.g., Ma, M. and Guo, J. Automatic Image Cropping for Mobile Device with Built-in Camera. IEEE Consumer Communications and Networking Conference, 2004). For efficiency, some embodiments use a coarse search to find an approximate best crop, followed by a local fine search. Integral images efficiently calculate the penalty criteria during the search.

ii. Automatic Lighting/Color Enhancement

In addition to composition problems, consumer images frequently have suboptimal exposure and lighting. For most image creativity applications, color and tone editing is a must-have function.

In some embodiments, the editing component 60 provides one or more image enhancement options that automatically improve images that have contrast and shadow defects. In general, any of a wide variety of different image enhancement processes may be applied to the image, including those that bring dark subjects out of the shadows, lighten underexposed images, improve overall contrast, and add saturation to some color regions.

c. Layout Component

In general, the layout component 62 may use any of a wide variety of different image layout processes, subject to any number of layout criteria. In some embodiments, the layout component 62 arranges images on a rectangular canvas subject to the following primary criteria:
 (a) Image aspect ratios are respected
 (b) Image borders ($\beta$) and spacing ($\sigma$) between adjacent image borders are precisely specified Criterion (a) reflects the assumption that that process should not impose overlap or other hiding of image content unless specifically directed to do so; while criterion (b) provides accommodation for image borders or other features of graphic design going into the final presentation. The layout component 62 creates a new layout also based on the following secondary criteria:
 (c) Image areas should be proportional to positive relative area values supplied with the images
 (d) Images should occupy a maximum of the collage mock-up area 30

Figure 8:
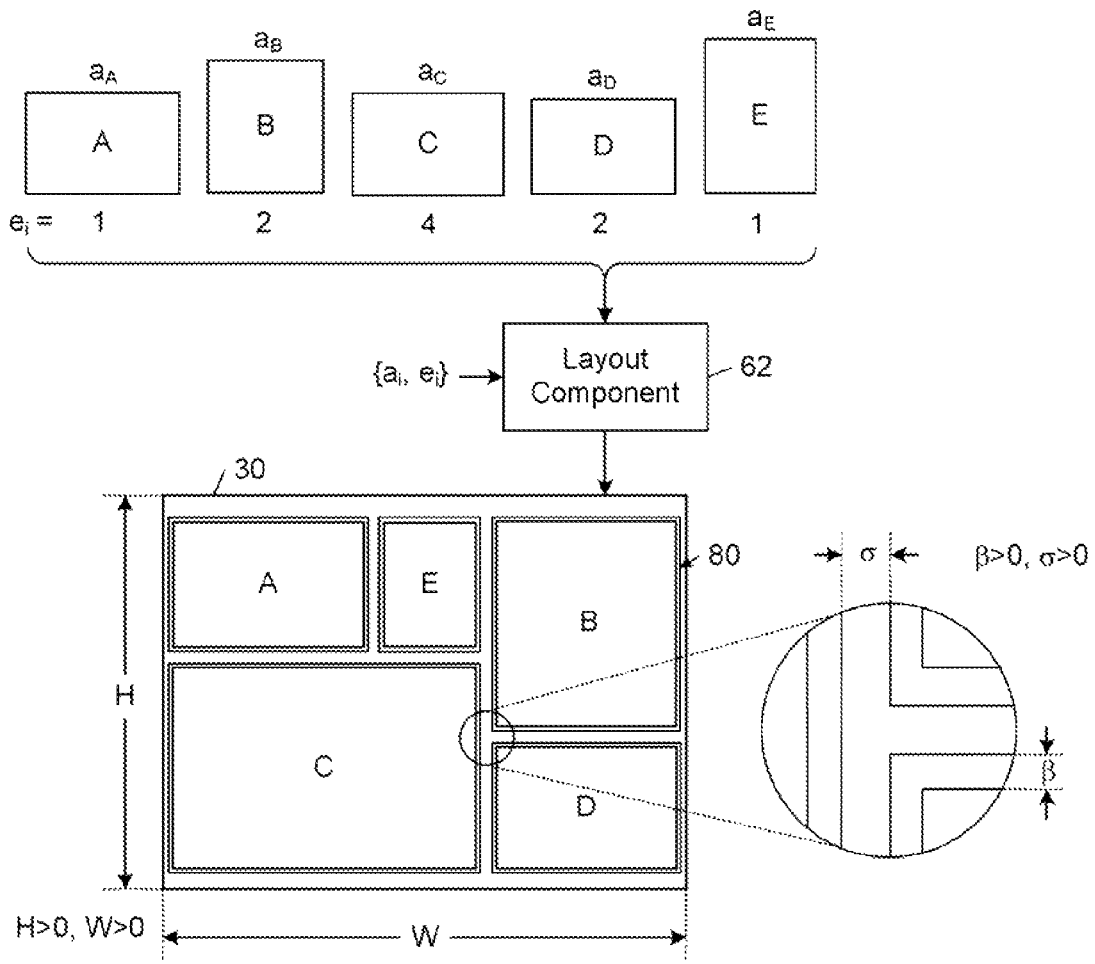
FIG. 8 is a diagrammatic view of an embodiment of an image collage generation process.

FIG. 8 shows a diagrammatic view of an embodiment of an image collage generation process that is implemented by an embodiment of the layout component 62. In this embodiment, the layout component 62 produces an image collage layout 80 in the collage mock-up area 30. Because of the primary criteria, pairs of adjacent images and blocks of images in the layout 80 have equal heights or widths. As long as the borders and spacing are not so thick that they take up the entire canvas in either dimension (a weak restriction), any set of images will fit together in this way. However, it cannot be guaranteed that the secondary criteria will be satisfied. Considering criterion (c), for example, notice that image C, which has a suggested nominal size (of 4, does not have area exactly four times that of either of the image A and E, which have suggested relative areas of 1. Considering criterion (d), although all the images are large enough to be easily visible, the composite does not completely fill the collage mockup area 30 in the vertical (height) direction.

Figure 9:
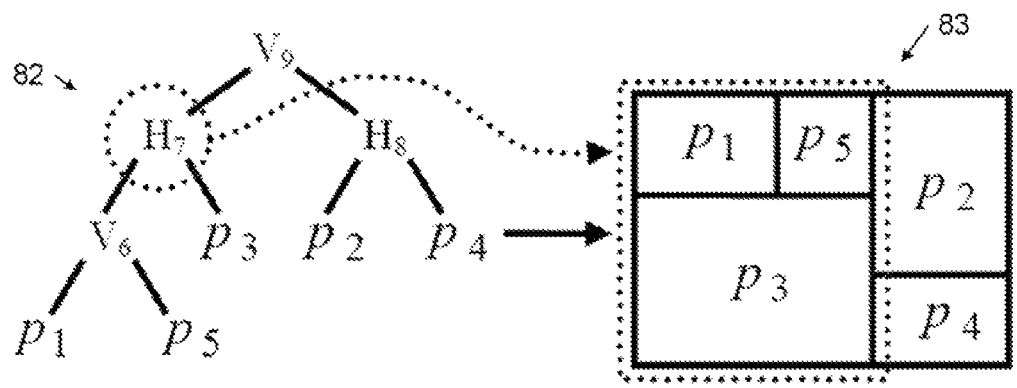
FIG. 9 is a diagrammatic view of a tree structure and an image collage generated from the tree structure in accordance with an embodiment of an image collage generation process.

In these embodiments, the layout component 62 encodes the composite as a binary tree 82 that induces a recursive partition of the canvas as illustrated in FIG. 9. In the tree 82, each terminal node corresponds to a respective image ($p_1, \ldots, p_4$). Each interior node corresponds to a "bounding box" on the collage mock-up area 30, and its designation as either a horizontal ("H") cut or a vertical ("V") cut divides the box into two smaller boxes. The following table shows the bounding box dimensions for the exemplary layout 83 shown in FIG. 9. In this example, for $n \leq 5$, $h_n$ and $w_n$ denote respectively the height and width for an image; but for $n > 5$, $h_n$ and $w_n$ denote the dimensions of a complete bounding box, including all borders and spacings contained therein (see, e.g., the bounding box 85 corresponding to node $H_7$). Generally, a table like this can be constructed quickly in a single depth-first traversal of the tree.

TABLE 3

Bounding box dimensions for layout 83 in FIG. 9.

| NODE LABEL | BOUNDING BOX HEIGHT | BOUNDING BOX WIDTH |
|---|---|---|
| n = 1, . . . , 5 | $h_n + 2\beta$ | $w_n + 2\beta$ |
| 6 | $h_1 + 2\beta$ | $w_1 + w_5 + \sigma + 4\beta$ |
| 7 | $h_6 + h_3 + \sigma + 2\beta$ | $w_6$ |
| 8 | $h_2 + h_4 + \sigma + 4\beta$ | $w_2 + 2\beta$ |
| 9 | $h_8$ | $w_7 + w_8 + \sigma$ |

The layout component 62 associates each tree having the form illustrated in FIG. 9 with a unique layout that satisfies the primary criteria and defines a precise area and position in the collage mock-up area 30 for each image. The layout component 62 computes the image areas subject to the primary criteria. This is accomplished by solving a system of N linear equations in N unknowns, where the variables are the image widths. Referring to the tree, we obtain one equation from each of the N−1 interior nodes, by equating dimensions of the bounding boxes of its two children. For example, in FIG. 9, the constraint furnished by node $H_7$ would be $W_6 = W_3$. There are two alternative N-th constraints: one equating height of the root bounding box to the height of the canvas, and another for the width. Generally, only one of the two N-th constraints will yield a solution that fits on the canvas.

The aspect ratio of an image is its height divided by its width. In this case, the coefficients in the linear system are all either 0, ±1, aspect ratios, or negated aspect ratios. As a result, the layout is "continuous": a small change to the aspect of an image results in a small change to the layout. For this reason, the process of determining a new layout from a tree structure that has been modified in response to a command from the user is referred to as "reflow."

The layout component 60 creates layouts and reflows layouts very quickly, permitting interactive editing and preview. A summary of the commands supported by the layout component 60 is given in Table 4. These commands include commands for adding, deleting, replacing, cropping and swapping images. FIG. 10 shows an example of the swap operations while also illustrating reflow. In the remainder of this section, we sketch out the processes for creating alternate layouts, and for changing the size of an image.

TABLE 4

Commands supported by the layout component 62.

| COMMAND | LAYOUT MODULE RESPONSE |
|---|---|
| Add or delete an image | Create a new layout |
| Replace an image | Replace terminal node in tree; reflow |
| Crop an image in layout | Change aspect ratio of terminal node in tree; reflow |
| Swap positions of two images | Swap terminal nodes in tree; reflow |
| Create an alternate layout | Obtain a new set of image relative areas; create a new layout |
| Change size of image in layout | Modify layout to accommodate new image size |

As indicated by FIG. 8, the inputs to the layout component 62 are an aspect ratio ($a_i$) and a suggested relative area ($e_i$) for each image i. Our approach to obtaining a different (or alternate) layout is to submit the images to the layout component 62 again, but with different suggested relative areas. As described above, the image collage authoring system 52 offers at most three different arrangements. In one arrangement, images are assigned default relative areas of 1.0, indicating that the layout component 62 should endeavor to find a layout in which all images have equal area. In a second arrangement, images with faces are given higher relative areas, and in a third, images estimated to be of higher overall quality are given higher relative areas. For the sake of simplicity, no check is made to verify that the resulting output is different from the preceding composite. For a vast majority of composites, alternate layouts constructed as described here are different.

Figure 11:
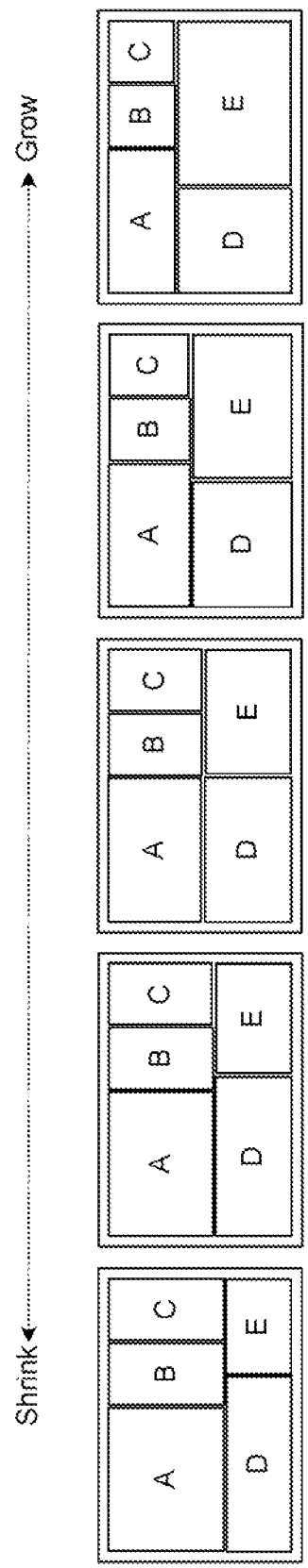
FIG. 11 is a diagrammatic view of a series of image collages generated from a common set of images in accordance with an embodiment of an image collage generation process in response to user input changing the size of a selected one of the images.

An image can be made larger or smaller in the context of a layout by manipulating the aspect ratios of all the other images, as illustrated in FIG. 11. To change the size of an image, the user interface 22 identifies the selected image and supplies a positive side-length factor. Values greater (less) than one cause the layout component 62 to grow (shrink) the selected image. The side-length factor is applied to the height (H) and width (W) of the selected image to preserve the aspect ratio.

The layout component 62 first determines target dimensions for the selected image by multiplying the current height and width by the side-length factor. Changes to the dimensions of the selected image are translated into target dimensions for the root bounding box. The layout component 62 can now determine new heights and widths for the remaining images such that target dimensions for both selected image and root bounding box will be realized upon reflow. For example, in the case of growing, images that are separated from the selected image by a horizontal (vertical) cut will have their aspect ratios reduced (increased).

Additional details regarding the construction and operation of the layout component 62 are described in U.S. patent application Ser. No. 11/769,671, filed Jun. 27, 2007, and in Atkins, C. B. Blocked Recursive Image Composition. ACM Multimedia, 2008.

V. EXEMPLARY OPERATING ENVIRONMENT

Embodiments of the image collage authoring system 10 may be implemented by one or more discrete modules (or data processing components) that are not limited to any particular hardware, firmware, or software configuration. In the illustrated embodiments, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

The collage generator module 12, the user interface module 14, and the display 24 may be co-located on a single apparatus or they may be distributed across multiple apparatus; if distributed across multiple apparatus, the collage generator module 12, the user interface module 14, and the display 24 may communicate with each other over local wired or wireless connections, or they may communicate over global network connections (e.g., communications over the internet).

In some implementations, process instructions (e.g., machine-readable code, such as computer software) for implementing the methods that are executed by the embodiments of the image collage authoring system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image collage authoring system 10 may be implemented in any one of a wide variety of electronic devices, including desktop computers, workstation computers, and server computers.

Figure 12:
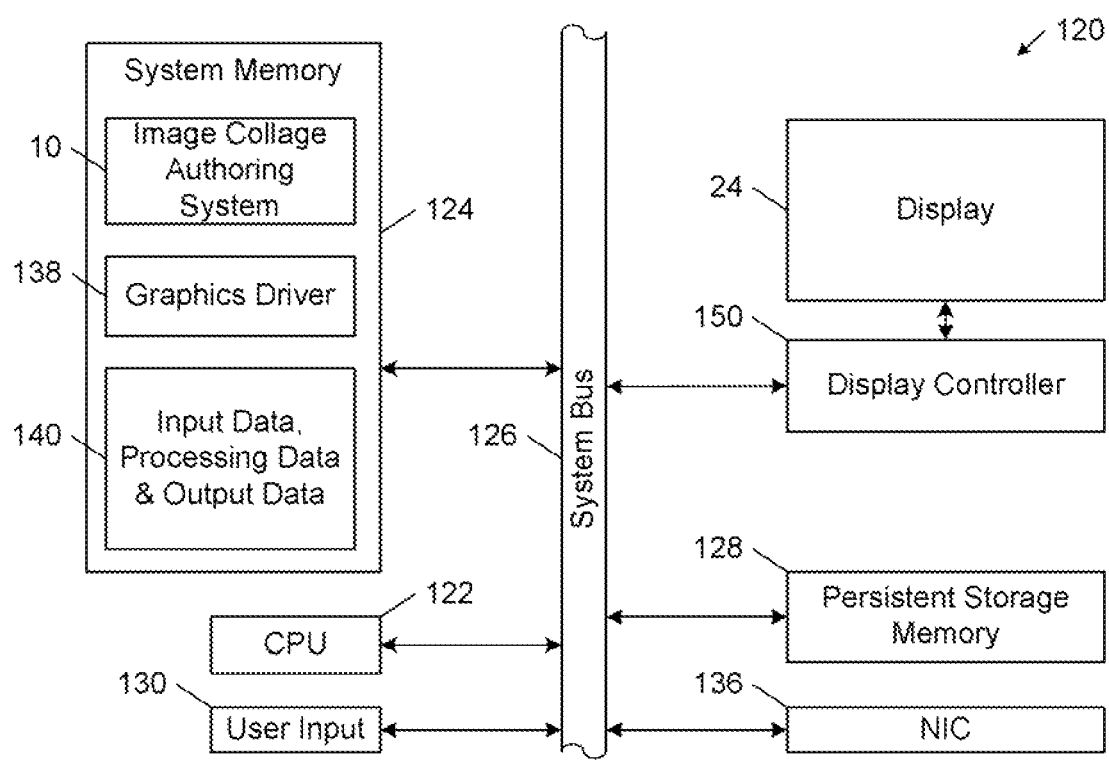
FIG. 12 is a block diagram of an embodiment of a computer system that implements an embodiment of the image collage authoring system of FIG. 1.

FIG. 12 shows an embodiment of a computer system 120 that can implement any of the embodiments of the image collage authoring system 10 that are described herein. The computer system 120 includes a processing unit 122 (CPU), a system memory 124, and a system bus 126 that couples processing unit 122 to the various components of the computer system 120. The processing unit 122 typically includes one or more processors, each of which may be in the form of any one of various commercially available processors. The system memory 124 typically includes a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., enter commands or data) with the computer 120 using one or more input devices 130 (e.g., a keyboard, a computer mouse, a microphone, joystick, and touch pad). Information may be presented through the user interface 22, which is displayed to the user on the display 24 (implemented by, e.g., a display monitor), which is controlled by a display controller 150 (implemented by, e.g., a video graphics card). The computer system 120 also typically includes peripheral output devices, such as speakers and a printer. One or more remote computers may be connected to the computer system 120 through a network interface card (NIC) 136.

As shown in FIG. 12, the system memory 124 also stores the image collage authoring system 10, a graphics driver 138, and processing information 140 that includes input data, processing data, and output data. In some embodiments, the image collage authoring system 10 interfaces with the graphics driver 138 (e.g., via a DirectX® component of a Microsoft Windows® operating system) to present the user interface 22 on the display monitor 24 for managing and controlling the operation of the image collage authoring system 10.

VI. CONCLUSION

The embodiments that are described herein provide an image collage authoring system that allows a user to retain control over the position and sizes of the images in a collage and to access image analysis based functionality that alleviates tedious and difficult tasks that commonly are associated with image selection, editing, and layout. These embodiments include a user interface that is designed to minimize the number and complexity of new concepts the users need to learn. The user interface provides a seamless integration between the images with which the user is engaged and the functionality used to control the images. The user interface has two modes of interaction: a basic mode that provides access to a basic set of intuitive features; and an enhanced mode that provides access to more complex functionality. The interaction model provides intelligent context-based interpretations of user inputs that enable the user to direct automatic selection of images in accordance with the user's specific purpose, while avoiding overwhelming the user with decision-making and control settings when proactive suggestions can be made automatically.

Other embodiments are within the scope of the claims.

The invention claimed is:

1. A method, comprising:
on a display, displaying a user interface comprising a catalog area, a collage mock-up area, and a mode select interface control operable to select an operational state of the user interface;
displaying thumbnails of images in the catalog area;
presenting a subset of the images in a layout over respective portions of the collage mock-up area, the collage mock-up area including a mock-up background object selectable to change the layout of the subset of the images;
receiving a user input gesture on a target object displayed on the user interface, the user input gesture being one of multiple types of user input gestures, the target object being one of multiple object types;
determining whether the user interface is in a first or a second operational state;
in response to determining that the user interface is in the first operational state, performing a first action, selected from a first set of actions corresponding to the first operational state, based on (i) the type of the received user input gesture, and (ii) the object type of the target object;
in response to determining that the user interface is in the second operational state, performing a second action, selected from a second set actions corresponding to the second operational state, based on (i) the type of the received user input gesture, and (ii) the object type of the target object; and
in response to a point-and-click gesture on the mock-up background object, changing the layout from a current layout to a new layout for the subset of the images.

2. The method of claim 1, wherein the multiple types of user input gestures comprise point-and-click gestures, drag-and-drop gestures, and scroll gestures.

3. The method of claim 1, wherein the multiple object types comprise the collage mock-up area, the model select interface control, the thumbnails of the images, an album icon displayed in the catalog area, and each of the subset of the images in the layout.

4. The method of claim 1, wherein:
when the user interface is in the first operational state, changing the layout comprises maintaining relative sizes and positions of each of the subset of the images in the layout while changing the layout between (i) a straight layout in which respective edges of adjacent images in the subset are parallel across respective dimensions of the layout, and (ii) a tilted layout in which the respective edges of the adjacent images in the subset are non-parallel across the respective dimensions of the layout; and when the user interface is in the second operational state, changing the layout comprises changing at least one of a relative size and a relative position of one or more of the images in the subset.

5. The method of claim 1, wherein:
when the user interface is in the first operational state and the received user input gesture is a point-and-click gesture on a target one of the subset of the images presented in the collage mock-up area, the first action comprises selecting the target image; and
when the user interface is in the second operational state and the received user input gesture is a point-and-click gesture on one of the subset of the images presented in the collage mock-up area, the second action comprises creating a modified image of the target image and replacing the target image with the modified image in the layout.

6. The method of claim 5, wherein creating the modified image comprises at least one of: (i) automatically cropping the target image, and (ii) automatically enhancing the target image.

7. The method of claim 1, wherein the catalog area comprises an album area and an image area, the album area comprising an album icon associated with a collection of images corresponding to the displayed thumbnails, the thumbnails being displayed in the image area.

8. The method of claim 7, wherein:
when the user interface is in the second operational state and the received user input gesture is a point-and-click gesture on the album icon, the second action comprises (i) automatically selecting an image from the collection, (ii) adding the selected image to the subset of the images to produce a new subset of the images, (iii) selecting a different layout for the new subset of the images, and (iv) presenting the different layout in the collage mock-up area.

9. The method of claim 7, wherein:
when the user interface is in the second operational state and the received user input gesture is a point-and-click gesture on a target one of the thumbnails shown in the image area, the second action comprises automatically rearranging the thumbnails shown in the image area according to a similarity between the target thumbnail and other thumbnails corresponding to the collection of images.

10. The method of claim 1, wherein presenting the subset of the images in the layout comprises presenting each respective one of the subset of the images in a respective frame that defines a boundary around the respective image in the layout.

11. The method of claim 10, wherein:
when the user interface is in the first operational state and the received user input gesture is a drag-and-drop gesture defining a movement of the respective image within the respective frame from a first position to a second position within the respective frame, the first action comprises repositioning the respective image within the respective frame to define a different view of the respective image through the respective frame.

12. The method of claim 10, wherein:
when the user interface is in the first operational state and the received user input gesture is a drag-and-drop gesture defining a movement of the respective image within the respective frame from a first position to a second position over a second respective image in the subset within a second respective frame of the layout, the first action comprises swapping positions of the respective image and the second respective image in the layout.

13. The method of claim 10, wherein:
when the user interface is in the first operational state and the received user input gesture is a scroll gesture with respect to the respective image, the first action comprises re-sizing a region of the respective image presented through the respective frame.

14. The method of claim 1, wherein:
when the user interface is in the second operational state and the received user input gesture is a drag-and-drop gesture defining a movement of a first image in the subset from a first position to a second position over a second image in the subset, the second action comprises swapping relative positions of the first and second images in the layout; and
swapping the relative positions comprises (i) determining a different layout of the images that exchanges the relative positions of the first and second images and maintains relative positions of the other images in the subset, and (ii) presenting the different layout in the collage mock-up area.

15. The method of claim 1, wherein:
when the user interface is in the second operational state and the received user input gesture is a drag-and-drop gesture defining a movement of a selected one of the thumbnails from a first position to a second position over a target one of the images in the subset, the second action comprises replacing the target image in the subset with the image corresponding to the selected thumbnail; and
replacing the target image in the subset with the image corresponding to the selected thumbnail produces a new subset of images for presentation in a different layout in the collage mock-up area.

16. The method of claim 15, wherein the different layout comprises the image corresponding to the selected thumbnail being positioned in an equivalent relative position in the layout as the target image.

17. The method of claim 1, wherein:
when the user interface is in the second operational state and the received user input gesture is a scroll gesture with respect to a target one of the images in the subset, the second action comprises (i) re-sizing the target image, (ii) determining a different layout for the subset of the images that accommodates the re-sized target image and maintains relative positions of the images in the layout, and (iii) presenting the different layout in the collage mock-up area.

18. A non-transitory computer-readable medium storing instructions that, when executed by a computer, cause the computer to:
on a display, display a user interface comprising a catalog area, a collage mock-up area, and a mode select interface control operable to select an operational state of the user interface;
display thumbnails of images in the catalog area;
present a subset of the images in a layout over respective portions of the collage mock-up area, the collage mock-up area including a mock-up background object selectable to change the layout of the subset of the images;
receive a user input gesture on a target object displayed on the user interface, the user input gesture being one of multiple types of user input gestures, the target object being one of multiple object types;
determine whether the user interface is in a first or second operational state;
in response to determining that the user interface is in the first operational state, perform a first action, selected from a first set of actions corresponding to the first operational state, based on (i) the type of the received user input gesture, and (ii) the object type of the target object;

in response to determining that the user interface is in the second operational state, perform a second action, selected from a second set actions corresponding to the second operational state, based on (i) the type of the received user input gesture, and (ii) the object type of the target object;

in response to a point-and-click gesture on the mock-up background object, change the layout from a current layout to a new layout for the subset of the images.

19. An apparatus comprising:

a hardware memory storing instructions; and a hardware processor coupled to the memory to execute the instructions, causing the hardware processor to:

on a display, display a user interface comprising a catalog area, a collage mock-up area, and a mode select interface control operable to select an operational state of the user interface;

display thumbnails of images in the catalog area;

present a subset of the images in a layout over respective portions of the collage mock-up area, the collage mock-up area including a mock-up background object selectable to change the layout of the subset of the images;

receive a user input gesture on a target object displayed on the user interface, the user input gesture being one of multiple types of user input gestures, the target object being one of multiple object types;

determine whether the user interface is in a first or a second operational state;

in response to determining that the user interface is in the first operational state, perform a first action, selected from a first set of actions corresponding to the first operational state, based on (i) the type of the received user input gesture, and (ii) the object type of the target object;

in response to determining that the user interface is in a second operational state, perform a second action, selected from a second set of actions corresponding to the second operational state, based on (i) the type of the received user input gesture, and (ii) the object type of the target object; and in response to a point-and-click gesture on the mock-up background object, change the layout from a current layout to a new layout for the subset of images.

\* \* \* \* \*